(12) United States Patent
Zou et al.

(10) Patent No.: US 12,323,476 B2
(45) Date of Patent: *Jun. 3, 2025

(54) COMPUTER-IMPLEMENTED METHOD, SMART CONFERENCE ROOM SYSTEM, AND COMPUTER-PROGRAM PRODUCT

(71) Applicant: BOE Technology Group Co., Ltd., Beijing (CN)

(72) Inventors: Xiangxiang Zou, Beijing (CN); Yangyang Zhang, Beijing (CN); Longyu Wang, Beijing (CN); Hailong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,642

(22) Filed: Mar. 6, 2024

(65) Prior Publication Data

US 2024/0214437 A1 Jun. 27, 2024

Related U.S. Application Data

(63) Continuation of application No. 17/848,822, filed on Jun. 24, 2022, now Pat. No. 11,956,288, which is a
(Continued)

(51) Int. Cl.
*H04L 65/403* (2022.01)
*G06F 3/14* (2006.01)
(Continued)

(52) U.S. Cl.
CPC ............ *H04L 65/403* (2013.01); *G06F 3/14* (2013.01); *G06K 7/1417* (2013.01); *G06K 19/06037* (2013.01); *G06F 3/0488* (2013.01)

(58) Field of Classification Search
CPC ....... H04L 65/403; G06F 3/14; G06F 3/0488; G06K 7/1417; G06K 19/06037
(Continued)

(56) References Cited

U.S. PATENT DOCUMENTS 10,824,997 B2 * 11/2020 Hill .................. G06Q 10/02
2007/0124682 A1 5/2007 Fukeda et al.
(Continued)

FOREIGN PATENT DOCUMENTS

CN 108418888 A 8/2018
CN 110969268 A 4/2020
(Continued)

OTHER PUBLICATIONS

International Search Report & Written Opinion mailed Mar. 23, 2022, regarding PCT/CN2021/102371.
(Continued)

*Primary Examiner* — Ruolei Zong
(74) *Attorney, Agent, or Firm* — Intellectual Valley Law, P.C.

(57) ABSTRACT

A smart conference room system is provided. The smart conference room system includes an intelligent conference interactive panel including one or more processors configured to convert user input into a conference information, a signage, and a memory configured to store the conference information. The intelligent conference interactive panel is configured to transmit conference information to one or more terminal devices. The one or more terminal devices are configured to perform a controllable operation based on the conference information transmitted to the one or more terminal devices. The intelligent conference interactive panel is further configured to receive a status check signal reminding a user of a conference room that a scheduled conference period of time is expired or about to expire.

20 Claims, 8 Drawing Sheets

| Meeting Name | Time Period | User | Contact information |
|---|---|---|---|
| Meeting 1 | 10:00 a.m. – 11:00 a.m. | User 1 | xxxxxxx |
| Meeting 2 | 11:00 a.m. – 12:00 p.m. | User 2 | xxxxxxx |
| Meeting 3 | 12:00 p.m. – 1:00 p.m. | User 3 | xxxxxxx |
| Meeting 4 | 1:00 p.m. – 2:00 p.m. | User 4 | xxxxxxx |
| Meeting 5 | 2:00 p.m. – 3:00 p.m. | User 5 | xxxxxxx |

RB

Related U.S. Application Data continuation-in-part of application No. PCT/CN2021/102371, filed on Jun. 25, 2021.

(51) Int. Cl.
*G06K 7/14* (2006.01)
*G06K 19/06* (2006.01)
*G06F 3/0488* (2022.01)

(58) Field of Classification Search
USPC .......................................................... 709/204
See application file for complete search history.

(56) References Cited

U.S. PATENT DOCUMENTS

| | | | |
|---|---|---|---|
| 2014/0029474 A1 | 1/2014 | Bhagavatula et al. | |
| 2014/0139426 A1* | 5/2014 | Kryze | G06F 3/011 |
| | | | 345/156 |
| 2015/0288913 A1* | 10/2015 | Maruyama | H04N 21/42204 |
| | | | 348/445 |
| 2016/0307167 A1 | 10/2016 | Bathiya | |
| 2016/0335605 A1 | 11/2016 | Tessler | |
| 2019/0108492 A1* | 4/2019 | Nelson | G06F 40/186 |
| 2019/0273767 A1* | 9/2019 | Nelson | H04M 7/0027 |
| 2020/0104804 A1 | 4/2020 | Fujimura et al. | |
| 2020/0112450 A1* | 4/2020 | Chhabra | H04L 65/403 |
| 2020/0226514 A1 | 7/2020 | Zheng et al. | |
| 2020/0394570 A1 | 12/2020 | Ge | |
| 2021/0399911 A1* | 12/2021 | Jorasch | H04L 12/1822 |
| 2023/0254412 A1* | 8/2023 | Jorasch | H04N 7/147 |
| | | | 709/204 |

FOREIGN PATENT DOCUMENTS

| | | | | |
|---|---|---|---|---|
| CN | 111290728 A | | 6/2020 | |
| JP | 2007043493 A | * | 2/2007 | ........... G06Q 10/109 |

OTHER PUBLICATIONS

Non-Final Office Action in the U.S. Appl. No. 17/848,822, dated Aug. 11, 2023.
Response to Non-Final Office Action in the U.S. Appl. No. 17/848,822, dated Nov. 10, 2023.
Notice of Allowance in the U.S. Appl. No. 17/848,822, dated Dec. 7, 2023.

* cited by examiner

| Meeting Name | Time Period | User | Contact information |
|---|---|---|---|
| Meeting 1 | 10:00 a.m. – 11:00 a.m. | User 1 | xxxxxx |
| Meeting 2 | 11:00 a.m. – 12:00 p.m. | User 2 | xxxxxx |
| Meeting 3 | 12:00 p.m. – 1:00 p.m. | User 3 | xxxxxx |
| Meeting 4 | 1:00 p.m. – 2:00 p.m. | User 4 | xxxxxx |
| Meeting 5 | 2:00 p.m. – 3:00 p.m. | User 5 | xxxxxx |

| Meeting Name | Time Period | User | Contact information |
|---|---|---|---|
| Meeting 1 | 10:00 a.m. – 11:00 a.m. | User 1 | xxxxxxx |
| Meeting 2 | 11:00 a.m. – 12:00 p.m. | User 2 | xxxxxxx |
| Meeting 3 | 12:00 p.m. – 1:00 p.m. | User 3 | xxxxxxx |
| Meeting 4 | 1:00 p.m. – 2:00 p.m. | User 4 | xxxxxxx |
| Meeting 5 | 2:00 p.m. – 3:00 p.m. | User 5 | xxxxxxx |

COMPUTER-IMPLEMENTED METHOD, SMART CONFERENCE ROOM SYSTEM, AND COMPUTER-PROGRAM PRODUCT

CROSS-REFERENCE TO RELATED APPLICATION

This application is a continuation of U.S. application Ser. No. 17/848,822, filed Jun. 24, 2022, which is a continuation-in-part of International Application No. PCT/CN2021/102371, filed Jun. 25, 2021. Each of the forgoing applications is herein incorporated by reference in its entirety for all purposes.

TECHNICAL FIELD

The present invention relates to a computer-implemented method, a smart conference room system, and a computer-program product.

BACKGROUND

Employees of an organization or in a building may reserve a conference room, e.g., by putting their names down on a reservation sign-up sheet on the door of the conference room, or using a software executed on a computer network to book the conference room. When a user runs over the scheduled meeting time, the subsequent user may come in the conference room to inform them the conference room is reserved for the subsequent user at that time. The occupants of the conference room must either give up the room or ask the subsequent user to wait. Efficient utilization of the conference room can be difficult.

SUMMARY

In one aspect, the present disclosure provides a smart conference room system, comprising an intelligent conference interactive panel comprising one or more processors configured to convert user input into a conference information, a signage, and a memory configured to store the conference information; wherein the intelligent conference interactive panel is configured to transmit conference information to one or more terminal devices; and the one or more terminal devices are configured to perform a controllable operation based on the conference information transmitted to the one or more terminal devices; wherein the intelligent conference interactive panel is further configured to receive a status check signal reminding a user of a conference room that a scheduled conference period of time is expired or about to expire; wherein the conference information further comprises a status update signal; wherein the memory further stores computer-executable instructions for controlling the one or more processors to generate the status update signal and transmit the status update signal to the signage, causing to display status of the conference room on the signage; wherein the signage is outside a conference room; and the intelligent conference interactive panel is inside the conference room.

Optionally, the smart conference room system further comprises a gateway; the conference information comprises a conference agenda; the intelligent conference interactive panel is configured to exchange information with the gateway, the gateway configured to track conference agenda status of the conference agenda stored in the intelligent conference interactive panel, the intelligent conference interactive panel is configured to transmit the conference information to the gateway; and the gateway is configured to transmit the conference information to the one or more terminal devices.

Optionally, the intelligent conference interactive panel and the gateway are connected via a wired connection, thereby allowing the intelligent conference interactive panel to exchange information with the gateway through a wire; and the intelligent conference interactive panel is configured to provide power to the gateway through a connecting line.

Optionally, the signage is configured to communicate with the gateway.

Optionally, the conference information further comprises conference room status information and conference participant information; and the intelligent conference interactive panel is configured to transmit at least one of the conference agenda, the conference room status information, or the conference participant information to the signage.

Optionally, the intelligent conference interactive panel is further configured to display an interactive user interface on an intelligent conference interactive panel in the conference room; and receive the user input for a future meeting input through the interactive user interface, for converting into a part of the conference information.

Optionally, the status check signal comprises a first prompt signal reminding a present user of a present meeting that a present period of time is about to expire; wherein the memory and the one or more processors are connected with each other; and the memory stores computer-executable instructions for controlling the one or more processors to during the present period of time, cause to display a first prompt message to a present user of the present meeting, requesting response on whether an extension of the present period of time is needed, the first prompt message being generated based on the first prompt signal; and receive a first response signal from the present user in response to the first prompt message.

Optionally, upon a determination that the first response signal requests the extension of the present period of time to an extended period of time overlapping with a subsequent period of time, the memory further stores computer-executable instructions for controlling the one or more processors to transmit a second prompt signal to a subsequent user of a subsequent meeting requesting approval on request for the extension of the present period of time to the extended period of time; and receive a second response signal from the subsequent user in response to the second prompt signal; wherein, upon a determination that the second response signal approves the request for the extension of the present period of time to the extended period of time, the memory further stores computer-executable instructions for controlling the one or more processors to generate a notification signal notifying the present user the request for the extension of the present period of time to the extended period of time being approved.

Optionally, the memory further stores computer-executable instructions for controlling the one or more processors to prior to expiration of the extended period of time, generate an update signal; and transmit the update signal to a subsequent user indicating that the conference room has become available.

Optionally, the status check signal comprises a reminder signal.

Optionally, the memory further stores computer-executable instructions for controlling the one or more processors to receive the reminder signal when the status update signal indicates that the conference room is occupied.

Optionally, the signage comprises a touch control display panel configured to display a reminder object; and wherein the memory further stores computer-executable instructions for controlling the one or more processors to activate the reminder object upon receiving a touch signal on the touch control display panel, thereby receiving the reminder signal from the signage.

Optionally, the one or more terminal devices comprise a portable device; wherein the memory further stores computer-executable instructions for controlling the one or more processors to generate a bar code signal and transmit the bar code signal to the signage, causing to display a two-dimensional bar code on the signage; and prior to receiving the reminder signal, initiate, by the two-dimensional bar code, a user interface on a portable device of a subsequent user, upon the two-dimensional bar code being scanned by the portable device, wherein the user interface allows the subsequent user to send the reminder signal.

In another aspect, the present disclosure provides a computer-implemented method, comprising converting, by an intelligent conference interactive panel, user input into a conference information, and storing, by the intelligent conference interactive panel, the conference information; transmitting, by the intelligent conference interactive panel, conference information to one or more terminal devices; performing a controllable operation by the one or more terminal devices based on the conference information transmitted to the one or more terminal devices; receiving, by the intelligent conference interactive panel, a status check signal reminding a user of a conference room that a scheduled conference period of time is expired or about to expire; and generating a status update signal and transmitting the status update signal, by the intelligent conference interactive panel, to a signage, causing to display status of the conference room on the signage; wherein the signage is outside a conference room; and the intelligent conference interactive panel is inside the conference room.

Optionally, the computer-implemented method further comprises tracking, by a gateway, conference agenda status of the conference agenda stored in the intelligent conference interactive panel by data exchange between the gateway and the intelligent conference interactive panel; transmitting, by the intelligent conference interactive panel, conference information to the gateway; and transmitting, by the gateway, the conference information to the one or more terminal devices.

Optionally, the status check signal includes a first prompt signal reminding a present user of a present meeting that the present period of time is about to expire; wherein the computer-implemented method further comprises during the present period of time, displaying, by the intelligent conference interactive panel, a first prompt message to a present user of the present meeting requesting response on whether an extension of the present period of time is needed, the first prompt message being generated based on the first prompt signal; and receiving a first response signal, by the intelligent conference interactive panel, from the present user in response to the first prompt message.

Optionally, upon a determination that the first response signal requests the extension of the present period of time to an extended period of time overlapping with the subsequent period of time, the computer-implemented method further comprises transmitting, by the intelligent conference interactive panel, a second prompt signal to a subsequent user of a subsequent meeting requesting approval on request for the extension of the present period of time to the extended period of time; and receiving, by the intelligent conference interactive panel, a second response signal from the subsequent user in response to the second prompt signal; wherein, upon a determination that the second response signal approves the request for the extension of the present period of time to the extended period of time, the computer-implemented method further comprises generating, by the intelligent conference interactive panel, a notification signal notifying the present user the request for the extension of the present period of time to the extended period of time being approved.

Optionally, the computer-implemented method further comprises, prior to expiration of the extended period of time, generating, by the intelligent conference interactive panel, an update signal; and transmitting the update signal to the subsequent user indicating that the conference room has become available.

Optionally, the status check signal comprises a reminder signal reminding a present user of a present meeting that the present period of time is expired; wherein the computer-implemented method further comprises transmitting the reminder signal to the present user indicating a request from a subsequent user to use the conference room.

Optionally, the computer-implemented method further comprises receiving the reminder signal when the status update signal indicates that the conference room is occupied.

Optionally, the signage comprises a touch control display panel configured to display a reminder object; and wherein receiving the reminder signal from the signage comprises receiving a touch signal activating the reminder object.

Optionally, the computer-implemented method further comprises generating a bar code signal and transmitting the bar code signal to the signage, causing to display a two-dimensional bar code on the signage; prior to receiving the reminder signal, initiating, by the two-dimensional bar code, a user interface on a portable device of the subsequent user, upon the two-dimensional bar code being scanned by the portable device, wherein the user interface allows the subsequent user to send the reminder signal to use the conference room; and receiving, by the intelligent conference interactive panel, the reminder signal transmitted by the portable device.

Optionally, transmitting the reminder signal to the present user comprises transmitting the reminder signal, by the signage, to the intelligent conference interactive panel in the conference room.

Optionally, the computer-implemented method further comprises displaying an interactive user interface on an intelligent conference interactive panel in the conference room; and receiving the user input for a future meeting input through the interactive user interface on the intelligent conference interactive panel, for converting into a part of the conference information.

In another aspect, the present disclosure provides a computer-program product comprising a non-transitory tangible computer-readable medium having computer-readable instructions thereon, the computer-readable instructions being executable by a processor to cause the processor to perform causing an intelligent conference interactive panel to convert user input into a conference information and to store the conference information; causing the intelligent conference interactive panel to transmit conference information to one or more terminal devices; causing the one or more terminal devices to perform a controllable operation based on the conference information transmitted to the one or more terminal devices; causing the intelligent conference interactive panel to receive a status check signal reminding a user of a conference room that a scheduled conference period of time is expired or about to expire; and causing the intelligent conference interactive panel to generate a status update signal and transmit the status update signal to a signage, causing to display status of the conference room on the signage; wherein the signage is outside a conference room; and the intelligent conference interactive panel is inside the conference room.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method, a smart conference room system, and a computer-program product that substantially obviate one or more of the problems due to limitations and disadvantages of the related art. In one aspect, the present disclosure provides a smart conference room system. In some embodiments, the smart conference room system includes an intelligent conference interactive panel including one or more processors configured to convert user input into a conference information, and a memory configured to store the conference agenda. Optionally, the intelligent conference interactive panel is configured to transmit conference information to one or more terminal devices; and the one or more terminal devices are configured to perform a controllable operation based on the conference information transmitted to the one or more terminal devices. Optionally, the conference information includes a conference agenda including a present meeting schedule and a subsequent meeting schedule. Optionally, the conference information includes conference room status information. Optionally, the conference information includes conference participant information.

Optionally, the intelligent conference interactive panel is configured to communicate with a gateway, the gateway configured to monitor conference agenda status of the conference agenda stored in the intelligent conference interactive panel; the intelligent conference interactive panel is configured to transmit conference information to the gateway; the gateway is configured to transmit the conference information to one or more terminal devices; and the one or more terminal devices is configured to perform a controllable operation based on the conference information transmitted to the one or more terminal devices.

Figure 1:
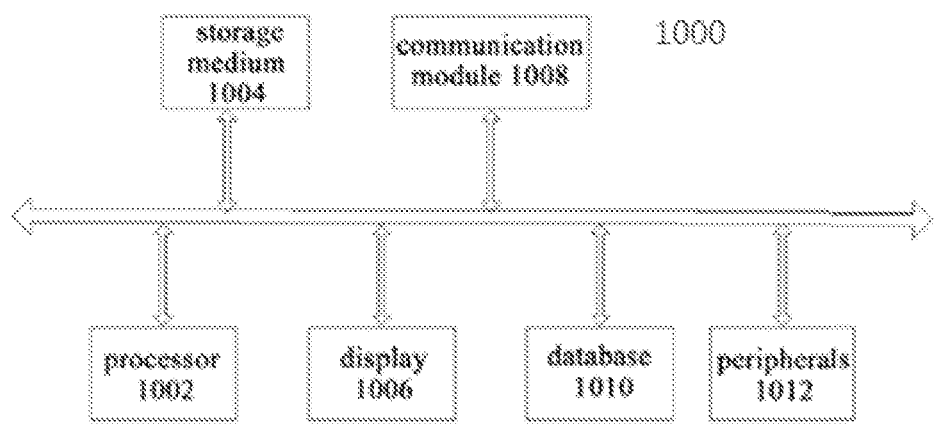
FIG. 1 is a schematic diagram illustrating a smart conference room system in some embodiments according to the present disclosure.

FIG. 1 is a schematic diagram of a structure of a smart conference room system in some embodiments according to the present disclosure. Referring to FIG. 1, in some embodiments, the smart conference room system 1000 may include any appropriate type of TV, such as a plasma TV, a liquid crystal display (LCD) TV, a touch screen TV, a projection TV, a non-smart TV, a smart TV, etc. The smart conference room system 1000 may also include other computing systems, such as a personal computer (PC), a tablet or mobile computer, or a smart phone, etc. In addition, the smart conference room system 1000 may be any appropriate content-presentation device capable of presenting any appropriate content. Users may interact with the smart conference room system 1000 to perform other activities of interest.

As shown in FIG. 1, the smart conference room system 1000 may include a processor 1002, a storage medium 1004, a display 1006, a communication module 1008, a database 1010 and peripherals 1012. Certain devices may be omitted and other devices may be included to better describe the relevant embodiments.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display device or electronic apparatus display such as LCD or OLED based devices. The peripherals 112 may include various sensors and other I/O devices, such as keyboard and mouse.

It will be understood by one of ordinary skill in the art that all or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information and which may accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

Figure 2A:
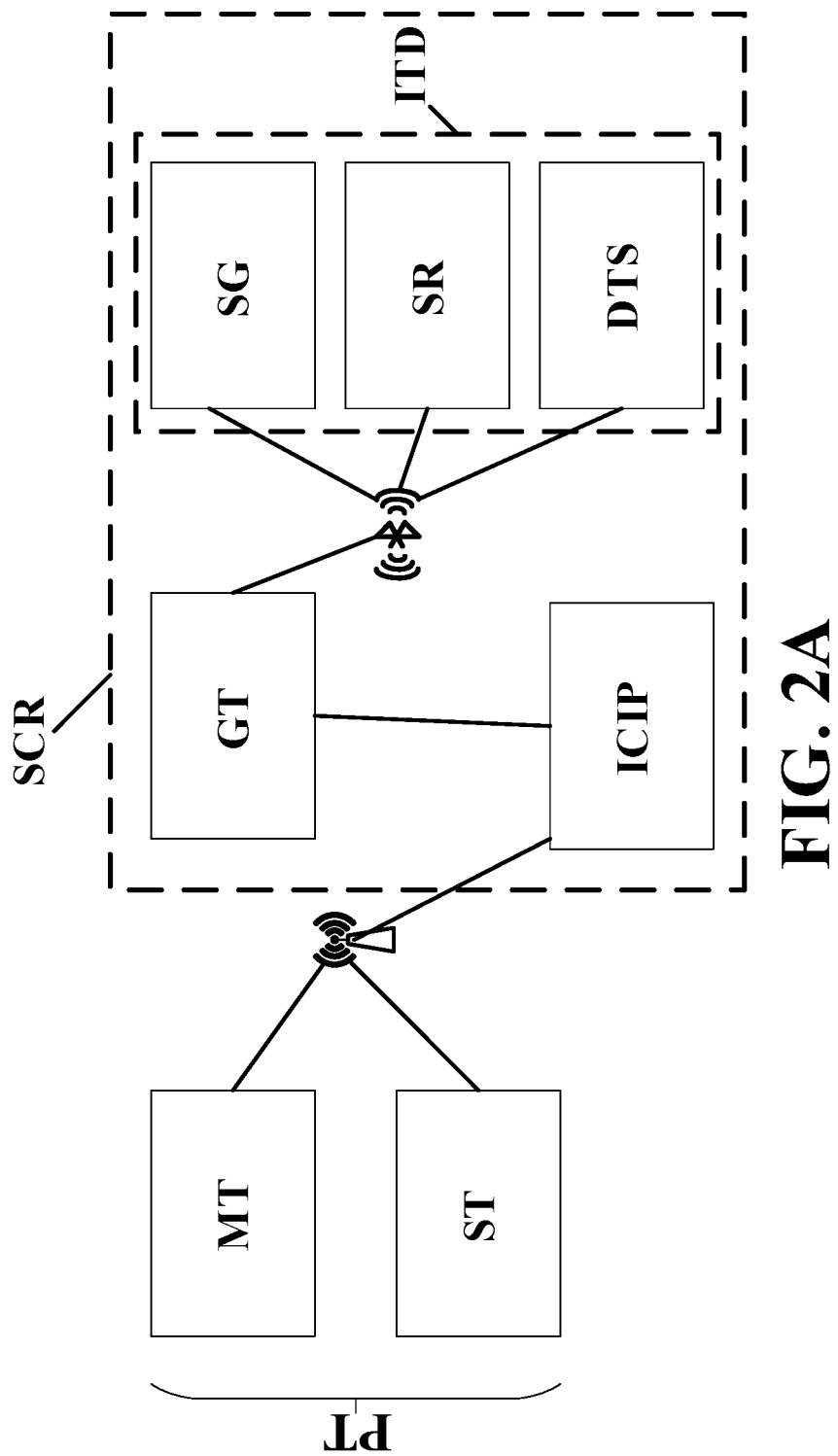
FIG. 2A is a schematic diagram illustrating an implementation of a smart conference room system in some embodiments according to the present disclosure.

FIG. 2A is a schematic diagram illustrating an implementation of a smart conference room system in some embodiments according to the present disclosure. Referring to FIG. 2A, the smart conference room system SCR in some embodiments includes an intelligent conference interactive panel ICIP in the conference room, for example, an intelligent conference interactive panel ICIP on which the meeting attendees may view contents of the meeting or provide input, e.g., through touch control. The intelligent conference interactive panel ICIP is configured to generate a conference agenda, the intelligent conference interactive panel ICIP includes a memory configured to store the conference agenda. In one example, a conference management platform is loaded on the intelligent conference interactive panel ICIP, and the conference management platform is configured to generate a conference agenda and save the conference agenda on a local database. In another example, the intelligent conference interactive panel ICIP is a touch control interactive panel configured to allow a user to input information, e.g., through touch control, thereby generating conference agenda.

In some embodiments, the intelligent conference interactive panel ICIP is configured to communicate with a gateway GT. The gateway GT is configured to monitor conference agenda status of the conference agenda stored in the intelligent conference interactive panel ICIP. In some embodiments, the smart conference room system SCR further includes a gateway GT. Examples of gateways include various edge computing gateways, such as the Hewlett Packard Enterprise EL20, the Intel DK300, and Dell IoT Gateway 5500. In some embodiments, the gateway GT is configured to have a static IP address, and is configured to monitor one or more static IP addresses of the intelligent conference interactive panel ICIP. The conference management platform is configured to communication with the gateway GT through the static IP address of the gateway GT and the one or more static IP addresses (e.g., one or more static IP addresses of the conference management terminal CMT).

Referring to FIG. 2A, the intelligent conference interactive panel ICIP in some embodiments is further configured to be in communication with a plurality of data publishing terminals PT and monitor data publishing status of the plurality of data publishing terminals PT. In one example, the plurality of data publishing terminals PT include a mobile terminal MT (e.g., a smart phone) and a stationary terminal ST (e.g., a desktop computer). A respective one of the plurality of data publishing terminals PT may include a user interface for inputting data, for example, inputting a user request for scheduling a meeting in a conference room. The plurality of data publishing terminals PT may be utilized by a user to perform various tasks related to use of the conference room. In one example, the plurality of data publishing terminals PT may be utilized by a user to transmit a request for scheduling a meeting in the conference room. In another example, the plurality of data publishing terminals PT may be utilized by a user to transmit a request for extension of meeting duration in the conference when the meeting has started but before the original scheduled time duration has expired. In another example, the plurality of data publishing terminals PT may be utilized by another user to transmit a signal approving or disapproving the request for extension of meeting duration. In another example, the plurality of data publishing terminals PT may be utilized by a user to transmit a reminder signal reminding a previous user their scheduled time period or extended time period has expired or will expire soon.

Figure 2B:
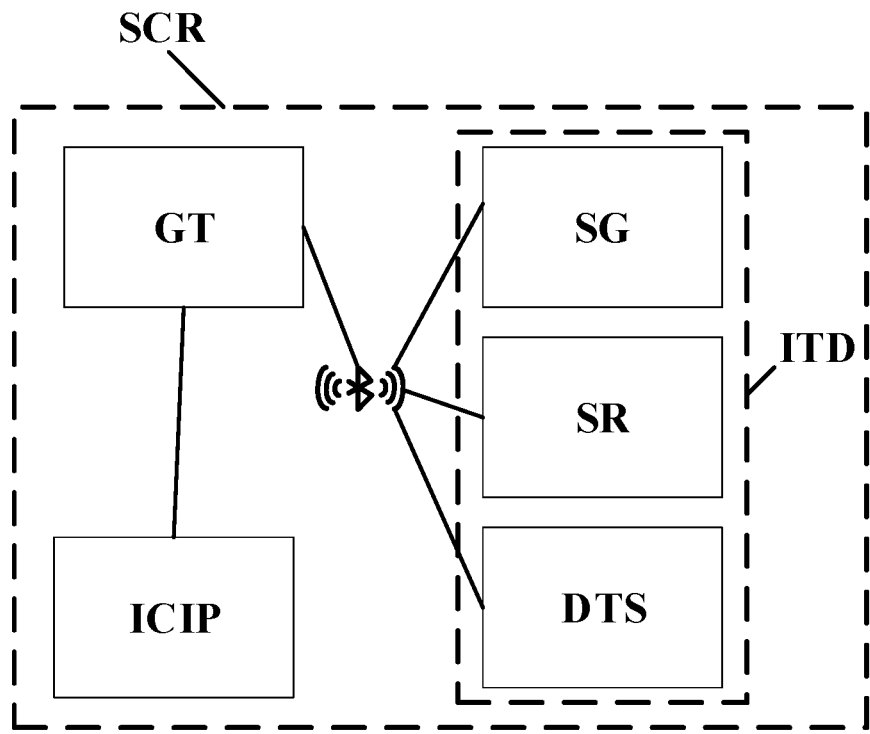
FIG. 2B is a schematic diagram illustrating an implementation of a smart conference room system in some embodiments according to the present disclosure.

FIG. 2B is a schematic diagram illustrating an implementation of a smart conference room system in some embodiments according to the present disclosure. Referring to FIG. 2B, the smart conference room system SCR in some embodiments is operated independent of the plurality of data publishing terminals. The smart conference room system SCR is operated in a local network environment, greatly enhancing network security. The intelligent conference interactive panel ICIP includes a user interface for inputting data, for example, inputting a user request for scheduling a meeting in a conference room. The intelligent conference interactive panel ICIP may be utilized by a user to perform various tasks related to use of the conference room. In one example, the intelligent conference interactive panel ICIP may be utilized by a user to transmit a request for scheduling a meeting in the conference room. In another example, the intelligent conference interactive panel ICIP may be utilized by a user to transmit a request for extension of meeting duration in the conference when the meeting has started but before the original scheduled time duration has expired. In another example, the intelligent conference interactive panel ICIP may be utilized by another user to transmit a signal approving or disapproving the request for extension of meeting duration. In another example, the intelligent conference interactive panel ICIP may be utilized by a user to transmit a reminder signal reminding a previous user their scheduled time period or extended time period has expired or will expire soon.

In some embodiments, the intelligent conference interactive panel ICIP is configured to transmit conference information to the gateway GT; and the gateway GT is configured to transmit the conference information to one or more terminal devices ITD. In one example, the gateway GT and the intelligent conference interactive panel ICIP are connected through a local area network (depicted as LAN in FIG. 2). In some embodiments, the gateway GT is configured to have a static IP address, and is configured to monitor one or more static IP addresses of the intelligent conference interactive panel ICIP, or the one or more terminal devices ITD. The one or more terminal devices ITD are configured to perform a controllable operation based on the conference information transmitted to the one or more terminal devices ITD.

In some embodiments, the intelligent conference interactive panel ICIP and the gateway GT are connected via a wired connection, thereby allowing the intelligent conference interactive panel ICIP to communicate with the gateway GT through a wire. Optionally, the intelligent conference interactive panel ICIP is configured to provide power to the gateway GT through a connecting line.

In some embodiments, the system further include a signage SG, for example, placed on a door of the conference room. The signage SG may be utilized to perform various tasks related to use of the conference room. In one example, the signage SG is configured to display meeting information, including information on a present meeting and any future meetings. In another example, the signage SG may be utilized by a user to transmit a reminder signal reminding a previous user their scheduled time period or extended time period has expired. In another example, the signage SG is in communication with one or more other components of the smart conference room system, for example, to update meeting information. In some embodiments, the signage is configured to communicate with the gateway, thereby transmitting signals to, or receiving signals from, the intelligent conference interactive panel ICIP or the one or more terminal devices ITD. Optionally, the intelligent conference interactive panel is configured to transmit at least one of the conference agenda, the conference room status information, or the conference participant information to the signage, for example, through the gateway GT.

In some embodiments, the intelligent conference interactive panel is further configured to display an interactive user interface on an intelligent conference interactive panel in the conference room; and receive the user input for a future meeting input through the interactive user interface, for converting into a part of the conference information.

In some embodiments, the one or more terminal devices ITD includes one or more desktop sign DTS, for example, placed on a conference table. The one or more desktop sign DTS may be utilized to perform various tasks related to use of the conference room. In one example, the one or more desktop sign DTS are used for displaying names and titles of the conference participants.

In some embodiments, the gateway GT is in communication with various components of the smart conference room system. In one example, the gateway GT and the signage SG are connected through a short-ranged connection such as Bluetooth or 433 MHz radio frequency connection. In another example, the gateway GT and the one or more desktop sign DTS are connected through a short-ranged connection such as Bluetooth or 433 MHz radio frequency connection. In one example, the signage SG is configured to update meeting information, including information on a present meeting and any future meetings, upon receiving the conference information transmitted to the signage SG from the gateway GT. In another example, the one or more desktop sign DTS are configured to update meeting information, including information names and titles of the conference participants, upon receiving the conference information transmitted to the one or more desktop sign DTS from the gateway GT.

The intelligent conference interactive panel ICIP may be utilized to perform various tasks related to use of the conference room. In one example, the intelligent conference interactive panel ICIP may be utilized by a user to input or transmit a request for scheduling a meeting in the conference room. In another example, the intelligent conference interactive panel ICIP may be utilized by a user to input or transmit a request for extension of meeting duration in the conference when the meeting has started but before the original scheduled time duration has expired. In another example, the intelligent conference interactive panel ICIP may be utilized by a user to transmit a reminder signal to the user currently attending the meeting that their scheduled time period or extended time period has expired or will expire soon. In another example, the intelligent conference interactive panel ICIP may be utilized by a user to display a reminder signal to the user currently attending the meeting that their scheduled time period or extended time period has expired or will expire soon. In another example, the intelligent conference interactive panel ICIP is in communication with one or more other components of the smart conference room system, for example, to update meeting information.

In some embodiments, the conference management platform loaded on the intelligent conference interactive panel ICIP is configured to periodically or non-periodically query the conference agenda stored in the local database, and configured to compare a scheduled conference time with a current system time. When the scheduled conference time matches with the current system time, the conference management platform is configured to transmit relevant conference information to a gateway server of the gateway GT. The gateway server is configured to parse the conference information, and configured to transmit the conference information to one or more terminal devices (for example, the signage SG, the one or more desktop sign DTS). Upon receiving the conference information from the gateway GT, the one or more terminal devices are configured to perform a controllable operation based on the conference information transmitted to the one or more terminal devices. In one example, the one or more desktop sign DTS is configured to update information on conference participants. In another example, the signage is configured to update present and future meeting information.

In some embodiments, content data and background display data are transmitted separately to the one or more terminal devices, and the one or more terminal devices are configured to integrate the content data and the background display data upon receiving them separately.

In some embodiments, the conference management platform loaded on the intelligent conference interactive panel ICIP is configured to periodically or non-periodically transmit a query command to the gateway GT. Upon receiving the query command, the gateway GT is configured to query the one or more terminal devices ITD in communication with the gateway GT to obtain status information of the one or more terminal devices ITD in communication with the gateway GT. The gateway GT is configured to transmit the status information to the intelligent conference interactive panel ICIP. The intelligent conference interactive panel ICIP is configured to display the status information on its user interface, through which a user may add or remove terminal device from a list of terminal devices in communication with the gateway GT.

In some embodiments, the one or more terminal devices ITD further includes one or more sensors SR in the conference room, for example, an infrared sensor for detecting presence or absence of a person in the conference room, thereby determining the availability of the conference room.

In some embodiments, the gateway GT and the plurality of data publishing terminals PT are connected through a wide area network (e.g., wireless connection through a wireless network such as 4G or 5G). Alternatively, the gateway GT and the plurality of data publishing terminals PT are connected through a local area network.

In some embodiments, the smart conference room system includes a memory; one or more processors; wherein the memory and the one or more processors are connected with each other. In some embodiments, the memory stores computer-executable instructions for controlling the one or more processors to receive a first request for a present meeting in a conference room for a present period of time; and receive a second request for a subsequent meeting in the conference room for a subsequent period of time. The first request and the second request may be submitted though various components of the smart conference room system, for example, through a mobile terminal MT of the plurality of data publishing terminals PT, through a stationary terminal ST of the plurality of data publishing terminals PT, or through the intelligent conference interactive panel ICIP. In one example, the intelligent conference interactive panel ICIP is configured to receive a first request for scheduling a present meeting in a conference room for a present period of time; and receive a second request for scheduling a subsequent meeting in the conference room for a subsequent period of time, thereby generating or updating the conference agenda. In another example, the intelligent conference interactive panel ICIP is configured to convert a user input of a first request for scheduling a present meeting in a conference room for a present period of time into the conference information; and convert a user input of a second request for scheduling a subsequent meeting in the conference room for a subsequent period of time into the conference information, thereby generating or updating the conference agenda.

In some embodiments, the intelligent conference interactive panel ICIP is further configured to receive a status check signal reminding a user of the conference room that a scheduled conference period of time is expired or about to expire. In one example, the status check signal includes a prompt signal reminding a present user of the present meeting that the present period of time is about to expire. In another example, the status check signal includes a reminder signal reminding a present user of the present meeting that the present period of time is expired.

In some embodiments, the status check signal includes a first prompt signal reminding a present user of the present meeting that the present period of time is about to expire. Optionally, during the present period of time, the memory stores computer-executable instructions for controlling the one or more processors (e.g., a processor of the intelligent conference interactive panel ICIP) to cause to display a first prompt message to a present user of the present meeting upon receiving the first prompt signal, requesting response on whether an extension of the present period of time is needed. The first prompt message being generated based on the first prompt signal. The first prompt message may be displayed automatically for every scheduled meeting. Alternatively, the first prompt signal may be initiated by a subsequent user of the conference room (e.g., using a respective one of the plurality of data publishing terminals PT). The first prompt message may be displayed after the present meeting has started but before the present meeting is scheduled to end. In one example, the first prompt message is displayed at a certain time point prior to expiration of the present period of time, for example, 5 minutes, 10 minutes, 15 minutes, 20 minutes, or 30 minutes before expiration of the present period of time.

In some embodiments, during the present period of time, the memory stores computer-executable instructions for controlling the one or more processors to receive a first response signal from the present user in response to the first prompt message. When the present user receives the first prompt message, the present user can determine whether or not an extension of the present period of time is needed, and can respond to the first prompt message with a first response signal (e.g., yes or no). In one example, the intelligent conference interactive panel ICIP in the conference room is configured to display a first prompt message upon receiving the first prompt signal, and the present user may utilize the intelligent conference interactive panel ICIP in the conference room to transmit the first response signal. In another example, a respective one of the plurality of data publishing terminals PT (e.g., a mobile terminal MT) is configured to display the first prompt message upon receiving the first prompt signal, and the present user may utilize the respective one of the plurality of data publishing terminals PT to transmit the first response signal.

In some embodiments, upon a determination that the first response signal denies the extension of the present period of time, the present meeting may continue as scheduled, and the present user may continue occupying the conference room until the expiration of the present period of time.

In some embodiments, upon a determination that the first response signal requests the extension of the present period of time to an extended period of time overlapping with the subsequent period of time, the memory further stores computer-executable instructions for controlling the one or more processors to transmit a second prompt signal to a subsequent user of the subsequent meeting requesting approval on request for the extension of the present period of time to the extended period of time. The second prompt signal may be displayed on a respective one of the plurality of data publishing terminals PT (e.g., a mobile terminal MT) to be reviewed by the subsequent user of the subsequent meeting. Upon reviewing the second prompt signal requesting approval on request for the extension of the present period of time to the extended period of time, the subsequent user of the subsequent meeting may respond to the request with either approval or disapproval (e.g., yes or no). In some embodiments, the memory further stores computer-executable instructions for controlling the one or more processors to receive a second response signal from the subsequent user in response to the second prompt signal.

In some embodiments, upon a determination that the second response signal disapproves the request for the extension of the present period of time, the present user may continue occupying the conference room until the expiration of the present period of time.

In some embodiments, upon a determination that the second response signal approves the request for the extension of the present period of time to the extended period of time, the memory further stores computer-executable instructions for controlling the one or more processors to generate a notification signal notifying the present user the request for the extension of the present period of time to the extended period of time being approved. In one example, the intelligent conference interactive panel ICIP in the conference room is configured to display the notification. In another example, a respective one of the plurality of data publishing terminals PT (e.g., a mobile terminal MT) is configured to display the notification.

In some embodiments, the subsequent user may partially approve the request for the extension of the present period of time, for example, the subsequent user may approve extension of the present period of time to an alternative period of time shorter than the extended period of time requested by the present user. The subsequent user may provide the alternative period of time in the second response signal. In some embodiments, upon a determination that the second response signal approves an alternative period of time shorter than the extended period of time requested by the present user, the memory further stores computer-executable instructions for controlling the one or more processors to generate a notification signal notifying the present user the alternative period of time. In one example, the intelligent conference interactive panel ICIP in the conference room is configured to display the notification of the alternative period of time. In another example, a respective one of the plurality of data publishing terminals PT (e.g., a mobile terminal MT) is configured to display the notification of the alternative period of time.

The present smart conference room system enables a smart prompting and rescheduling function that address several issues in scheduling and using the conference room. Without the present smart conference room system, often the conference room may be occupied by the present user when the present period of time has expired without the subsequent user being notified. The subsequent user of the conference room would not be able to find out the status of the conference room unless they investigate the status in situ, resulting in waste of time for the subsequent user and sometimes disputation between parties. Although a conference room system may mandate the present user to vacate the conference room by the expiration of the present period of time, e.g., by shutting down power and/or turning off the intelligent conference interactive panel in the conference room, the solution is inferior in terms of user experience. Particularly, the inferior solution by shutting down power and/or turning off the intelligent conference interactive panel still severely impact the present user of the conference room. The present smart conference room system provides an intelligent solution that accommodates needs of all users and seamlessly arranges usage of the conference room.

In some embodiments, the memory further stores computer-executable instructions for controlling the one or more processors to, prior to expiration of the extended period of time, generate an update signal; and transmit the update signal to the subsequent user indicating that the conference room has become available. In one example, the update signal is generated in response to the present user presses on an update button on the intelligent conference interactive panel. The smart conference room system further enhances the efficiency of conference room usage by enabling the present user to notify the subsequent user an early termination of the present meeting prior to the expiration of the extended period of time, so that the subsequent user may have the option of occupying the conference room before the expiration of the extended period of time.

Similarly, the present smart conference room system enables further extension of the meeting time that is initiated by the present user. In some embodiments, the memory further stores computer-executable instructions for controlling the one or more processors to receive a further extension request signal from the present user prior to expiration of the extended period of time; wherein, upon a determination that the further extension request signal requests further extension of the extended period of time to a further extended period of time, the memory further stores computer-executable instructions for controlling the one or more processors to transmit a third prompt signal to the subsequent user of the subsequent meeting requesting approval on request for the further extension of the extended period of time to the further extended period of time; and receive a third response signal from the subsequent user in response to the third prompt signal. Optionally, upon a determination that the third response signal approves the request for the further extension of the extended period of time to the further extended period of time, the memory further stores computer-executable instructions for controlling the one or more processors to generate a notification signal notifying the present user the request for the further extension of the extended period of time to the further extended period of time being approved.

Figure 3:
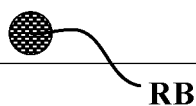
FIG. 3 is a schematic diagram illustrating a signage in some embodiments according to the present disclosure.

Referring to FIG. 2A and FIG. 2B, the one system in some embodiments further includes a signage SG outside the conference room. In some embodiments, the conference information further comprises a status update signal; the memory further stores computer-executable instructions for controlling the one or more processors to generate the status update signal and transmit the status update signal to the signage, causing to display status of the conference room on the signage SG outside the conference room. FIG. 3 is a schematic diagram illustrating a signage in some embodiments according to the present disclosure. Referring to FIG. 3, the signage in some embodiments is configured to display meeting information such as meeting name, time period of each meeting, user of the meeting and their contact information.

In some embodiments, the status check signal includes a reminder signal reminding a present user of the present meeting that the present period of time is expired. When the subsequent user arrives at the door of the conference room, the subsequent user may determine the status of the conference room, for example, by looking through a window of the conference room to check if the present meeting is still on-going. When it is time scheduled for the subsequent meeting, the subsequent user may remind the present user that they wish to use the conference room. In some embodiments, the memory further stores computer-executable instructions for controlling the one or more processors to receive a request from the subsequent user to use the conference room when the conference room is occupied, e.g., by the present user; and transmit a reminder signal to the present user indicating the request from the subsequent user. In one example, the memory further stores computer-executable instructions for controlling the one or more processors to receive the reminder signal from the signage when the conference room is occupied.

Various appropriate methods may be implemented to facilitate sending of the reminder signal. Referring to FIG. 3, the signage in some embodiments includes a reminder button RB which is a physical button configured to send the reminder signal to remind the present user when it is pressed. In one example, the reminder signal is an indicator light in the conference room, and when lit, the indicator light indicates the subsequent user is requesting use of the conference room. In another example, the reminder signal is a signal displayed on the intelligent conference interactive panel in the conference room, which may be viewed by the attendees of the present meeting. In another example, the reminder signal is transmitted to a respective one of the plurality of data publishing terminals (e.g., a mobile terminal) held by the present user, e.g., in form of a text message, a voice message, or a vibration.

Figure 4:
FIG. 4 is a schematic diagram illustrating a signage in some embodiments according to the present disclosure.

FIG. 4 is a schematic diagram illustrating a signage in some embodiments according to the present disclosure. Referring to FIG. 4, the signage in some embodiments includes a touch control display panel configured to display a reminder object RO. The memory further stores computer-executable instructions for controlling the one or more processors to activate the reminder object RO upon receiving a touch signal on the touch control display panel, thereby receiving the request from the subsequent user to use the conference room. In one example, the reminder signal is an indicator light in the conference room, and when lit, the indicator light indicates the subsequent user is requesting use of the conference room. In another example, the reminder signal is a signal displayed on the intelligent conference interactive panel in the conference room, which may be viewed by the attendees of the present meeting. In another example, the reminder signal is transmitted to a respective one of the plurality of data publishing terminals (e.g., a mobile terminal) held by the present user, e.g., in form of a text message, a voice message, or a vibration.

Figure 5:
FIG. 5 is a schematic diagram illustrating a signage in some embodiments according to the present disclosure.

In some embodiments, the signage has at least two states including a busy state indicating the conference room is unavailable and an idle state indicating the conference room is available. For example, the signage is in the busy state when the meeting information associated with the present meeting is still highlighted after the expiration of the present period of time. In another example, the signage is in the idle state when the meeting information associated with the present meeting is removed from the signage or is no longer highlighted. The busy state or the idle state of the signage may be indicated by various suitable means such as an independent indicator on the signage. The availability of the conference room may be determined by various suitable means such as an infrared sensor inside the conference room to detect presence or absence of person inside the conference room. In another example, the availability of the conference room may be determined by a radar on the intelligent conference interactive panel to detect presence or absence of person inside the conference room. In another example, the availability of the conference room may be determined by information input to the intelligent conference interactive panel by a user. By having a signage indicating the busy state or the idle state, an unintended disturbance of the present meeting albeit expired can be avoided. FIG. 5 is a schematic diagram illustrating a signage in some embodiments according to the present disclosure. Referring to FIG. 5, the signage is configured to display an independent indicator indicating the busy state or the idle state.

Figure 6:
FIG. 6 is a schematic diagram illustrating a signage in some embodiments according to the present disclosure.

To enhance user friendliness, reduce manufacturing costs (e.g., those associated with the touch control display panel), and/or save energy (e.g., that required for operating the physical button), the signage in some embodiments may be configured to display a two-dimensional bar code. FIG. 6 is a schematic diagram illustrating a signage in some embodiments according to the present disclosure. Referring to FIG. 6, in some embodiments, the memory further stores computer-executable instructions for controlling the one or more processors to generate a bar code signal and transmit the bar code signal to the signage, causing to display on the signage a quick response code for facilitating the reminder process described herein. In some embodiments, the memory further stores computer-executable instructions for controlling the one or more processors to, prior to receiving the reminder signal (e.g., indicating the request from the subsequent user to use the conference room), initiate, by the two-dimensional bar code, a user interface on a portable device of the subsequent user, upon the two-dimensional bar code being scanned by the portable device, wherein the user interface allows the subsequent user to send the request to use the conference room. The portable device may be, for example, a mobile terminal held by the subsequent user.

The reminder signal may be transmitted in various suitable means. In some embodiments, an intelligent conference interactive panel in the conference room is configured to generate and display the reminder signal, thereby transmitting the reminder signal to the present user. The intelligent conference interactive panel may be utilized as a communication hub for the present user of the conference room. For example, the intelligent conference interactive panel may be used to display various other signals and may have a user interface allowing user input. Accordingly, in some embodiments, the memory further stores computer-executable instructions for controlling the one or more processors to cause to display a first prompt message on the intelligent conference interactive panel upon receiving the first prompt signal, prompting the present user to input the first response signal on the intelligent conference interactive panel; and receive an input from the present user on the intelligent conference interactive panel, thereby receiving the first response signal. In some embodiments, the memory further stores computer-executable instructions for controlling the one or more processors to display an interactive user interface on an intelligent conference interactive panel in the conference room; and receive the user input for a future meeting input through the interactive user interface on the intelligent conference interactive panel, for converting into a part of the conference information.

In some embodiments, the signage and the intelligent conference interactive panel are in communication with each other, for example through a gateway. In some embodiments, the memory further stores computer-executable instructions for controlling the one or more processors to generate a status update signal and transmit the status update signal to the signage, causing to display status of the conference room on the signage outside the conference room; causing to display a first prompt message on the intelligent conference interactive panel upon receiving the first prompt signal, prompting the present user to input the first response signal on the intelligent conference interactive panel; and receive an input from the present user on the intelligent conference interactive panel, thereby receiving the first response signal. Upon expiration of the present period of time, the memory further stores computer-executable instructions for controlling the one or more processors to receive a reminder signal from the signage (e.g., indicating a request from the subsequent user to use the conference room) when the conference room is occupied; and transmit a reminder signal to the intelligent conference interactive panel indicating the request from the subsequent user. In some embodiments, the signage has at least two states including a busy state indicating the conference room is unavailable and an idle state indicating the conference room is available. Upon a determination that the second response signal denies the extension of the present period of time, the memory further stores computer-executable instructions for controlling the one or more processors to maintain the signage in the busy state.

In another aspect, the present disclosure provides a computer-implemented method. In some embodiments, the computer-implemented method includes converting, by an intelligent conference interactive panel, user input into a conference information, and storing, by the intelligent conference interactive panel, the conference information; transmitting, by the intelligent conference interactive panel, conference information to one or more terminal devices; and performing a controllable operation by the one or more terminal devices based on the conference information transmitted to the one or more terminal devices.

Optionally, the computer-implemented method includes tracking, by a gateway, conference agenda status of the conference agenda stored in the intelligent conference interactive panel by data exchange between the gateway and the intelligent conference interactive panel; transmitting, by the intelligent conference interactive panel, conference information to the gateway; and transmitting, by the gateway, the conference information to one or more terminal devices.

In some embodiments, generating the conference agenda includes receiving a first request for scheduling a present meeting in a conference room for a present period of time; and receiving a second request for scheduling a subsequent meeting in the conference room for a subsequent period of time. The computer-implemented method further comprises receiving, by the intelligent conference interactive panel, a status check signal reminding a user of the conference room that a scheduled conference period of time is expired or about to expire. Optionally, the status check signal includes a first prompt signal reminding a present user of the present meeting that the present period of time is about to expire. Optionally, the status check signal includes a reminder signal reminding a present user of the present meeting that the present period of time is expired.

Figure 7:
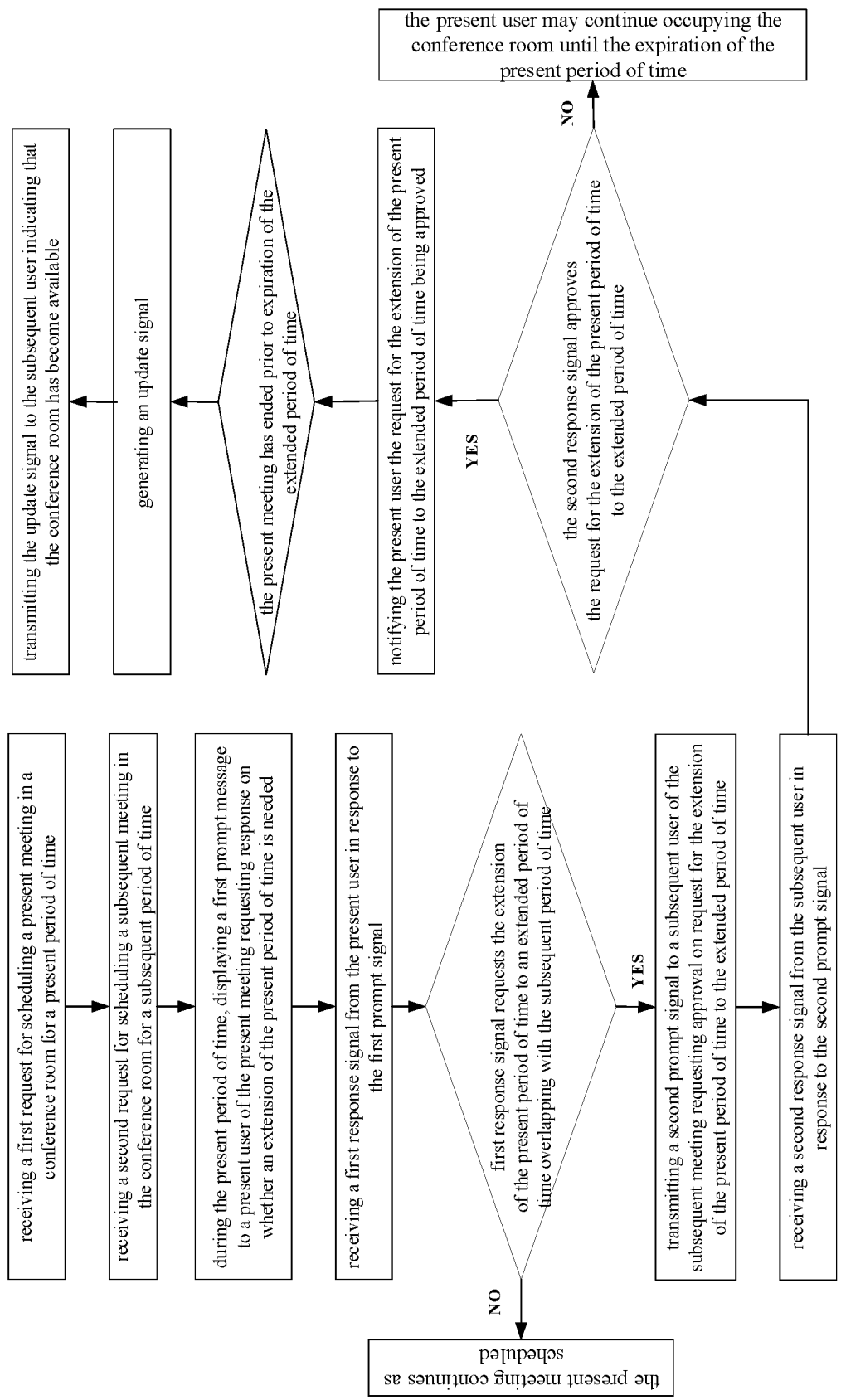
FIG. 7 is a flow chart illustrating a computer-implemented method in some embodiments according to the present disclosure.

In some embodiments, the status check signal includes a first prompt signal reminding a present user of the present meeting that the present period of time is about to expire. FIG. 7 is a flow chart illustrating a computer-implemented method in some embodiments according to the present disclosure. Referring to FIG. 7, the computer-implemented method in some embodiments includes receiving a first request for scheduling a present meeting in a conference room for a present period of time; receiving a second request for scheduling a subsequent meeting in the conference room for a subsequent period of time; during the present period of time, displaying a first prompt message to a present user of the present meeting requesting response on whether an extension of the present period of time is needed; and receiving a first response signal from the present user in response to the first prompt signal.

In some embodiments, upon a determination that the first response signal denies the extension of the present period of time, the present meeting may continue as scheduled, and the present user may continue occupying the conference room until the expiration of the present period of time.

In some embodiments, upon a determination that the first response signal requests the extension of the present period of time to an extended period of time overlapping with the subsequent period of time, the computer-implemented method further includes transmitting a second prompt signal, e.g., by the intelligent conference interactive panel, to a subsequent user of the subsequent meeting requesting approval on request for the extension of the present period of time to the extended period of time. Upon reviewing the second prompt signal requesting approval on request for the extension of the present period of time to the extended period of time, the subsequent user of the subsequent meeting may respond to the request with either approval or disapproval (e.g., yes or no). In some embodiments, the computer-implemented method further includes receiving a second response signal from the subsequent user in response to the second prompt signal.

In some embodiments, upon a determination that the second response signal disapproves the request for the extension of the present period of time, the present user may continue occupying the conference room until the expiration of the present period of time.

In some embodiments, upon a determination that the second response signal approves the request for the extension of the present period of time to the extended period of time, the computer-implemented method further includes notifying, e.g., by the intelligent conference interactive panel, the present user the request for the extension of the present period of time to the extended period of time being approved.

In some embodiments, the subsequent user may partially approve the request for the extension of the present period of time, for example, the subsequent user may approve extension of the present period of time to an alternative period of time shorter than the extended period of time requested by the present user. The subsequent user may provide the alternative period of time in the second response signal. In some embodiments, upon a determination that the second response signal approves an alternative period of time shorter than the extended period of time requested by the present user, the computer-implemented method further includes notifying the present user the alternative period of time.

The present computer-implemented method enables a smart prompting and rescheduling function that address several issues in scheduling and using the conference room. Without the present computer-implemented method, often the conference room may be occupied by the present user when the present period of time has expired without the subsequent user being notified. The subsequent user of the conference room would not be able to find out the status of the conference room unless they investigate the status in situ, resulting in waste of time for the subsequent user and sometimes disputation between parties. Although conference room management may mandate the present user to vacate the conference room by the expiration of the present period of time, e.g., by shutting down power and/or turning off the intelligent conference interactive panel in the conference room, the solution is inferior in terms of user experience. Particularly, the inferior solution by shutting down power and/or turning off the intelligent conference interactive panel still severely impact the present user of the conference room. The present computer-implemented method provides an intelligent solution that accommodates needs of all users and seamlessly arranges usage of the conference room.

The present meeting might end prior to expiration of the extended period of time. When it occurs, the present user may have the option of notifying the subsequent user. Referring to FIG. 7 again, the computer-implemented method in some embodiments further includes prior to expiration of the extended period of time, generating an update signal; and transmitting the update signal to the subsequent user indicating that the conference room has become available. In one example, the update signal is generated in response to the present user presses on an update button on the intelligent conference interactive panel. The present computer-implemented method further enhances the efficiency of conference room usage by enabling the present user to notify the subsequent user an early termination of the present meeting prior to the expiration of the extended period of time, so that the subsequent user may have the option of occupying the conference room before the expiration of the extended period of time.

In some embodiments, the computer-implemented method further includes receiving a further extension request signal from the present user prior to expiration of the extended period of time; wherein, upon a determination that the further extension request signal requests further extension of the extended period of time to a further extended period of time, the computer-implemented method further includes transmitting a third prompt signal to the subsequent user of the subsequent meeting requesting approval on request for the further extension of the extended period of time to the further extended period of time; and receiving a third response signal from the subsequent user in response to the third prompt signal. Optionally, upon a determination that the third response signal approves the request for the further extension of the extended period of time to the further extended period of time, the computer-implemented method further includes notifying the present user the request for the further extension of the extended period of time to the further extended period of time being approved.

Figure 8:
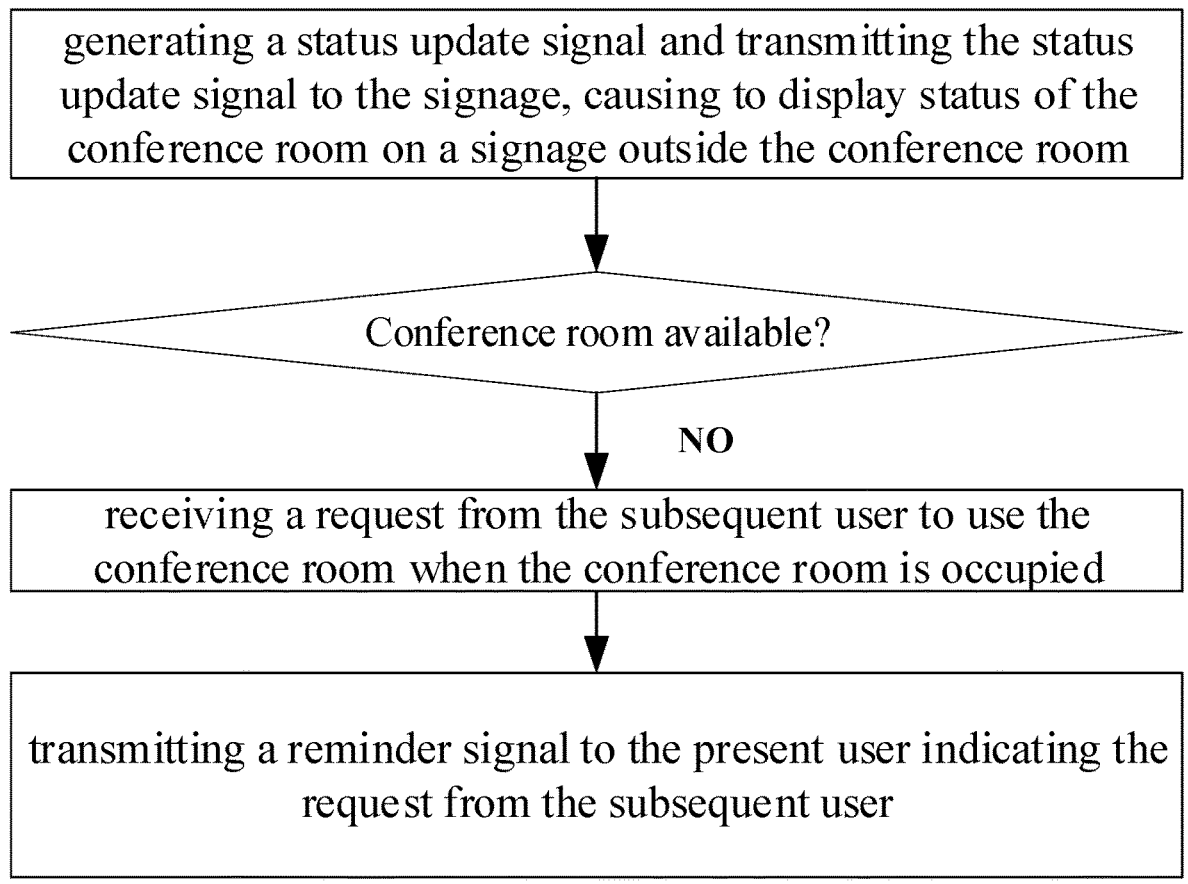
FIG. 8 is a flow chart illustrating a computer-implemented method in some embodiments according to the present disclosure.

In some embodiments, the status check signal includes a reminder signal reminding a present user of the present meeting that the present period of time is expired. The computer-implemented method further comprises transmitting the reminder signal to the present user indicating a request from the subsequent user to use the conference room. FIG. 8 is a flow chart illustrating a computer-implemented method in some embodiments according to the present disclosure. Referring to FIG. 8, the computer-implemented method in some embodiments further includes generating a status update signal and transmitting the status update signal to the signage, causing to display status of the conference room on a signage outside the conference room. Upon a determination that the conference room is occupied, the computer-implemented method in some embodiments further includes receiving the reminder signal (e.g., indicating a request from the subsequent user to use the conference room) when the conference room is occupied; and transmitting the reminder signal to the present user indicating the request from the subsequent user. In some embodiments, the computer-implemented method includes generating a status update signal and transmitting the status update signal, by the intelligent conference interactive panel, to a signage, causing to display status of the conference room on the signage; and receiving the reminder signal when the status update signal indicates that the conference room is occupied.

Various appropriate methods may be implemented to facilitate sending of the reminder signal. In one example, the signage includes a reminder button which is a physical button configured to send the reminder signal to remind the present user when it is pressed. In another example, the reminder signal is an indicator light in the conference room, and when lit, the indicator light indicates the subsequent user is requesting use of the conference room. In another example, the reminder signal is a signal displayed on the intelligent conference interactive panel in the conference room, which may be viewed by the attendees of the present meeting. In another example, the reminder signal is transmitted to a respective one of the plurality of data publishing terminals (e.g., a mobile terminal) held by the present user, e.g., in form of a text message, a voice message, or a vibration.

In some embodiments, the signage includes a touch control display panel configured to display a reminder object. The computer-implemented method further includes activating the reminder object upon receiving a touch signal on the touch control display panel, thereby receiving the request from the subsequent user to use the conference room. In one example, the reminder signal is an indicator light in the conference room, and when lit, the indicator light indicates the subsequent user is requesting use of the conference room. In another example, the reminder signal is a signal displayed on the intelligent conference interactive panel in the conference room, which may be viewed by the attendees of the present meeting. In another example, the reminder signal is transmitted to a respective one of the plurality of data publishing terminals (e.g., a mobile terminal) held by the present user, e.g., in form of a text message, a voice message, or a vibration.

In some embodiments, the computer-implemented method further includes generating a bar code signal and transmitting the bar code signal to the signage, causing to display a two-dimensional bar code on the signage. Prior to receiving the reminder signal (e.g., indicating the request from the subsequent user to use the conference room), the computer-implemented method further includes initiating, by the two-dimensional bar code, a user interface on a portable device of the subsequent user, upon the two-dimensional bar code being scanned by the portable device, wherein the user interface allows the subsequent user to send the request to use the conference room. The portable device may be, for example, a mobile terminal held by the subsequent user. Optionally, the computer-implemented method further includes receiving, by the intelligent conference interactive panel, the reminder signal transmitted by the portable device.

Various suitable methods may be used to determine whether or not the conference room is available for the subsequent user. In some embodiments, the signage has at least two states including a busy state indicating the conference room is unavailable and an idle state indicating the conference room is available. For example, the signage is in the busy state when the meeting information associated with the present meeting is still highlighted after the expiration of the present period of time. In another example, the signage is in the idle state when the meeting information associated with the present meeting is removed from the signage or is no longer highlighted. The busy state or the idle state of the signage may be indicated by various suitable means such as an independent indicator on the signage. In one example, the availability of the conference room may be determined by various suitable means such as an infrared sensor inside the conference room to detect presence or absence of person inside the conference room. In another example, the availability of the conference room may be determined by a radar on the intelligent conference interactive panel to detect presence or absence of person inside the conference room. In another example, the availability of the conference room may be determined by information input to the intelligent conference interactive panel by a user.

In some embodiments, transmitting the reminder signal to the present user includes transmitting the reminder signal to an intelligent conference interactive panel in the conference room.

In some embodiments, the computer-implemented method includes displaying the first prompt message on the intelligent conference interactive panel, prompting the present user to input the first response signal on the intelligent conference interactive panel. Optionally, receiving the first response signal includes receiving an input from the present user on the intelligent conference interactive panel. Optionally, the computer-implemented method further includes displaying an interactive user interface on an intelligent conference interactive panel in the conference room; and receiving the user input for a future meeting input through the interactive user interface on the intelligent conference interactive panel, for converting into a part of the conference information.

In some embodiments, the signage and the intelligent conference interactive panel are in communication with each other, for example through a gateway. In some embodiments, the computer-implemented method further includes generating a status update signal and transmitting the status update signal to the signage outside the conference room, causing to display status of the conference room on the signage. Optionally, the computer-implemented method includes displaying the first prompt message on the intelligent conference interactive panel, prompting the present user to input the first response signal on the intelligent conference interactive panel. Optionally, receiving the first response signal includes receiving an input from the present user on the intelligent conference interactive panel. Optionally, upon expiration of the present period of time, the computer-implemented method further includes receiving a request from the subsequent user to use the conference room when the conference room is occupied; and transmitting a reminder signal to the intelligent conference interactive panel indicating the request from the subsequent user.

Figure 9:
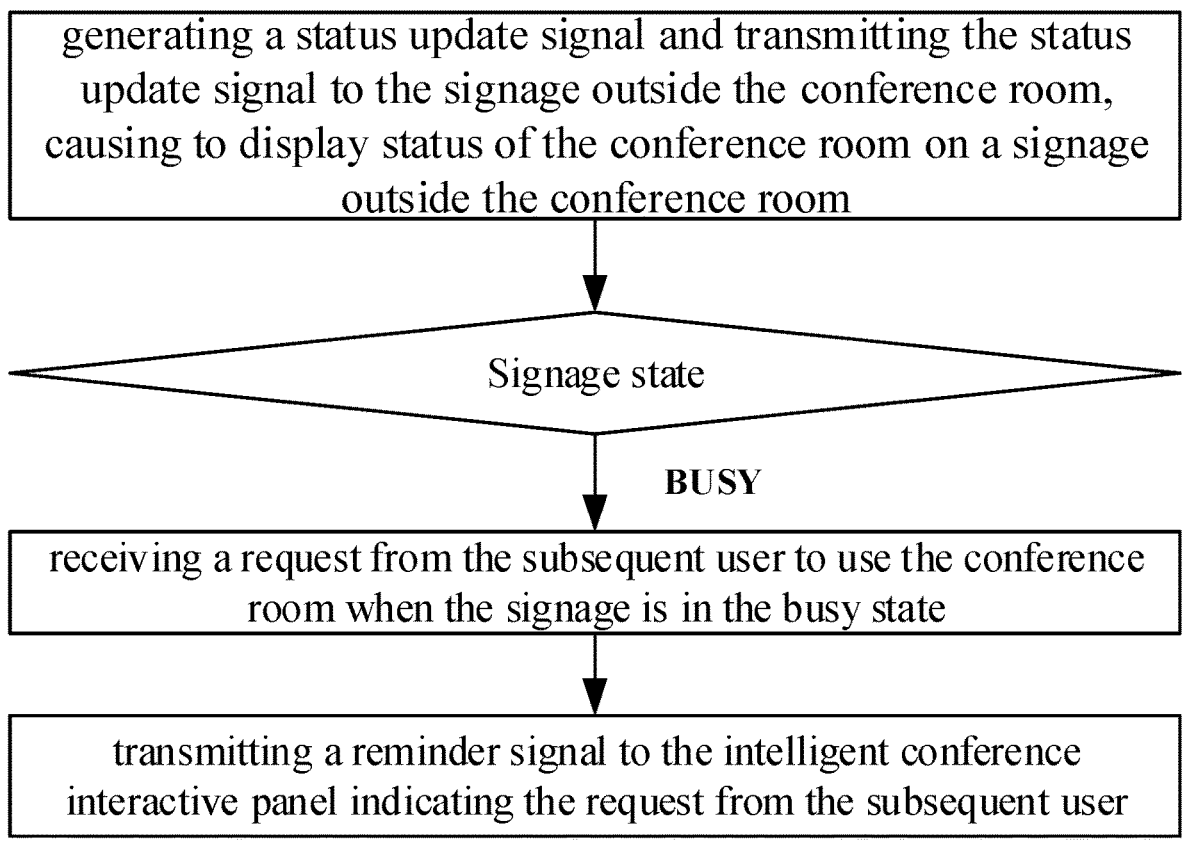
FIG. 9 is a flow chart illustrating a computer-implemented method in some embodiments according to the present disclosure.

FIG. 9 is a flow chart illustrating a computer-implemented method in some embodiments according to the present disclosure. Referring to FIG. 9, the computer-implemented method in some embodiments includes generating a status update signal and transmitting the status update signal to the signage outside the conference room, causing to display status of the conference room on a signage outside the conference room, the signage having at least two states including a busy state indicating the conference room is unavailable and an idle state indicating the conference room is available. Upon expiration of the present period of time, the computer-implemented method further includes receiving a request from the subsequent user to use the conference room when the signage is in the busy state; and transmitting a reminder signal to the intelligent conference interactive panel indicating the request from the subsequent user. Moreover, the computer-implemented method further includes displaying the first prompt message on the intelligent conference interactive panel, prompting the present user to input the first response signal on the intelligent conference interactive panel; and/or receiving an input from the present user on the intelligent conference interactive panel.

In another aspect, the present disclosure provides a computer-program product comprising a non-transitory tangible computer-readable medium having computer-readable instructions thereon. In some embodiments, the computer-readable instructions are executable by a processor to cause the processor to perform causing an intelligent conference interactive panel to convert user input into a conference information and to store the conference information; causing the intelligent conference interactive panel to transmit conference information to one or more terminal devices; and causing the one or more terminal devices to perform a controllable operation based on the conference information transmitted to the one or more terminal devices.

Optionally, the computer-readable instructions are executable by a processor to cause the processor to perform communicating the intelligent conference interactive panel with a gateway configured to monitor conference agenda status of the conference agenda stored in the intelligent conference interactive panel; transmitting, by the intelligent conference interactive panel, conference information to the gateway; and transmitting, by the gateway, the conference information to one or more terminal devices. Optionally, in order to generate the conference agenda, the computer-readable instructions are executable by a processor to cause the processor to perform receiving a first request for scheduling a present meeting in a conference room for a present period of time; and receiving a second request for scheduling a subsequent meeting in the conference room for a subsequent period of time. Optionally, the computer-readable instructions are executable by a processor to cause the processor to perform receiving, by the intelligent conference interactive panel, a status check signal reminding a user of the conference room that a scheduled conference period of time is expired or about to expire.

In some embodiments, the status check signal includes a first prompt signal reminding a present user of the present meeting that the present period of time is about to expire. Optionally, the computer-readable instructions are executable by a processor to cause the processor to perform receiving a first request for a present meeting in a conference room for a present period of time; receiving a second request for a subsequent meeting in the conference room for a subsequent period of time; during the present period of time, displaying a first prompt message to a present user of the present meeting requesting response on whether an extension of the present period of time is needed; and receiving a first response signal from the present user in response to the first prompt message. Optionally, upon a determination that the first response signal requests the extension of the present period of time to an extended period of time overlapping with the subsequent period of time, the computer-implemented method further includes transmitting a second prompt signal to a subsequent user of the subsequent meeting requesting approval on request for the extension of the present period of time to the extended period of time; and receiving a second response signal from the subsequent user in response to the second prompt signal. Optionally, upon a determination that the second response signal approves the request for the extension of the present period of time to the extended period of time, the computer-implemented method further comprising notifying the present user the request for the extension of the present period of time to the extended period of time being approved.

In some embodiments, the computer-readable instructions are executable by a processor to cause the processor to perform prior to expiration of the extended period of time, generating an update signal; and transmitting the update signal to the subsequent user indicating that the conference room has become available.

In some embodiments, the status check signal includes a reminder signal reminding a present user of the present meeting that the present period of time is expired. Optionally, the computer-readable instructions are executable by a processor to cause the processor to perform generating a status update signal and transmitting the status update signal, by the intelligent conference interactive panel, to a signage, causing to display status of the conference room on the signage; and receiving the reminder signal when the status update signal indicates that the conference room is occupied. Optionally, the computer-readable instructions are executable by a processor to cause the processor to perform generating a status update signal and transmitting the status update signal to the signage outside the conference room, causing to display status of the conference room on a signage outside the conference room; receiving the reminder signal from the signage (e.g., indicating a request from the subsequent user to use the conference room) when the conference room is occupied; and transmitting a reminder signal to the present user indicating the request from the subsequent user.

In some embodiments, the signage comprises a touch control display panel configured to display a reminder object. Optionally, the computer-readable instructions are executable by a processor to cause the processor to perform receiving a touch signal activating the reminder object, thereby receiving the request from the subsequent user to use the conference room.

In some embodiments, the computer-readable instructions are executable by a processor to cause the processor to perform generating a bar code signal and transmitting the bar code signal to the signage, causing to display a two-dimensional bar code on the signage. Optionally, prior to receiving the reminder signal from the signage (e.g., indicating the request from the subsequent user to use the conference room), the computer-readable instructions are executable by a processor to cause the processor to perform initiating, by the two-dimensional bar code, a user interface on a portable device of the subsequent user, upon the two-dimensional bar code being scanned by the portable device, wherein the user interface allows the subsequent user to send the request to use the conference room. Optionally, the computer-readable instructions are further executable by a processor to cause the processor to perform causing the intelligent conference interactive panel to receive the reminder signal transmitted by the portable device.

In some embodiments, the computer-readable instructions are executable by a processor to cause the processor to perform receiving, by the intelligent conference interactive panel in the conference room, the reminder signal, thereby transmitting the reminder signal to the present user.

In some embodiments, the computer-readable instructions are executable by a processor to cause the processor to perform generating a status update signal and transmitting the status update signal to the signage outside the conference room, causing to display status of the conference room on a signage outside the conference room; displaying the first prompt message on the intelligent conference interactive panel, prompting the present user to input the first response signal on the intelligent conference interactive panel; receiving an input from the present user on the intelligent conference interactive panel, thereby receiving the second response signal from the subsequent user; upon expiration of the present period of time, receiving a request from the subsequent user to use the conference room when the conference room is occupied; and transmitting a reminder signal to the intelligent conference interactive panel indicating the request from the subsequent user.

In some embodiments, the computer-readable instructions are executable by a processor to cause the processor to perform displaying a first prompt message on the intelligent conference interactive panel, prompting the present user to input the first response signal on the intelligent conference interactive panel; and receiving an input from the present user on the intelligent conference interactive panel, thereby receiving the second response signal from the subsequent user.

In some embodiments, the computer-readable instructions are executable by a processor to cause the processor to perform displaying an interactive user interface on an intelligent conference interactive panel in the conference room; and receiving the user input for a future meeting input through the interactive user interface on the intelligent conference interactive panel, for converting into a part of the conference information.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A smart conference room system, comprising:
   an intelligent conference interactive panel comprising one or more processors configured to convert user input into a conference information, a signage, and a memory configured to store the conference information;
   wherein the intelligent conference interactive panel is configured to transmit the conference information to one or more terminal devices; and
   the one or more terminal devices are configured to perform a controllable operation based on the conference information transmitted to the one or more terminal devices
   wherein the intelligent conference interactive panel is further configured to receive a status check signal reminding a user of a conference room that a scheduled conference period of time is expired or about to expire;
   wherein the conference information further comprises a status update signal;
   wherein the memory further stores computer-executable instructions for controlling the one or more processors to generate the status update signal and transmit the status update signal to the signage, causing to display status of the conference room on the signage;
   wherein the signage is outside the conference room; and
   the intelligent conference interactive panel is inside the conference room.

2. The smart conference room system of claim 1, further comprising a gateway;
   wherein the conference information comprises a conference agenda;
   the intelligent conference interactive panel is configured to exchange information with the gateway, the gateway configured to track conference agenda status of the conference agenda stored in the intelligent conference interactive panel, the intelligent conference interactive panel is configured to transmit the conference information to the gateway; and
   the gateway is configured to transmit the conference information to the one or more terminal devices.

3. The smart conference room system of claim 2, wherein the intelligent conference interactive panel and the gateway are connected via a wired connection, thereby allowing the intelligent conference interactive panel to exchange information with the gateway through a wire; and
   the intelligent conference interactive panel is configured to provide power to the gateway through a connecting line.

4. The smart conference room system of claim 2, wherein the signage is configured to communicate with the gateway.

5. The smart conference room system of claim 4, wherein the conference information further comprises conference room status information and conference participant information; and
   the intelligent conference interactive panel is configured to transmit at least one of the conference agenda, the conference room status information, or the conference participant information to the signage.

6. The smart conference room system of claim 1, wherein the intelligent conference interactive panel is further configured to:
   display an interactive user interface on an intelligent conference interactive panel in the conference room; and
   receive the user input for a future meeting input through the interactive user interface, for converting into a part of the conference information.

7. The smart conference room system of claim 1, wherein the status check signal comprises a first prompt signal reminding a present user of a present meeting that a present period of time is about to expire;
   wherein the memory and the one or more processors are connected with each other; and
   the memory stores computer-executable instructions for controlling the one or more processors to:
   during the present period of time, cause to display a first prompt message to a present user of the present meeting, requesting response on whether an extension of the present period of time is needed, the first prompt message being generated based on the first prompt signal; and
   receive a first response signal from the present user in response to the first prompt message.

8. The smart conference room system of claim 7, wherein, upon a determination that the first response signal requests the extension of the present period of time to an extended period of time overlapping with a subsequent period of time, the memory further stores computer-executable instructions for controlling the one or more processors to:
   transmit a second prompt signal to a subsequent user of a subsequent meeting requesting approval on request for the extension of the present period of time to the extended period of time; and
   receive a second response signal from the subsequent user in response to the second prompt signal;
   wherein, upon a determination that the second response signal approves the request for the extension of the present period of time to the extended period of time, the memory further stores computer-executable instructions for controlling the one or more processors to generate a notification signal notifying the present user the request for the extension of the present period of time to the extended period of time being approved.

9. The smart conference room system of claim 8, wherein the memory further stores computer-executable instructions for controlling the one or more processors to:
prior to expiration of the extended period of time, generate an update signal; and
transmit the update signal to a subsequent user indicating that the conference room has become available.

10. The smart conference room system of claim 1, wherein the status check signal comprises a reminder signal.

11. The smart conference room system of claim 10, wherein the memory further stores computer-executable instructions for controlling the one or more processors to:
receive the reminder signal when the status update signal indicates that the conference room is occupied.

12. The smart conference room system of claim 11, wherein the signage comprises a touch control display panel configured to display a reminder object; and
wherein the memory further stores computer-executable instructions for controlling the one or more processors to activate the reminder object upon receiving a touch signal on the touch control display panel, thereby receiving the reminder signal from the signage.

13. The smart conference room system of claim 11, wherein the one or more terminal devices comprise a portable device;
wherein the memory further stores computer-executable instructions for controlling the one or more processors to generate a bar code signal and transmit the bar code signal to the signage, causing to display a two-dimensional bar code on the signage; and
prior to receiving the reminder signal, initiate, by the two-dimensional bar code, a user interface on a portable device of a subsequent user, upon the two-dimensional bar code being scanned by the portable device, wherein the user interface allows the subsequent user to send the reminder signal.

14. A computer-implemented method, comprising:
converting, by an intelligent conference interactive panel, user input into a conference information, and storing, by the intelligent conference interactive panel, the conference information;
transmitting, by the intelligent conference interactive panel, conference information to one or more terminal devices;
performing a controllable operation by the one or more terminal devices based on the conference information transmitted to the one or more terminal devices;
receiving, by the intelligent conference interactive panel, a status check signal reminding a user of a conference room that a scheduled conference period of time is expired or about to expire; and
generating a status update signal and transmitting the status update signal, by the intelligent conference interactive panel, to a signage, causing to display status of the conference room on the signage;
wherein the signage is outside the conference room; and the intelligent conference interactive panel is inside the conference room.

15. The computer-implemented method of claim 14, further comprising:
tracking, by a gateway, conference agenda status of a conference agenda stored in the intelligent conference interactive panel by data exchange between the gateway and the intelligent conference interactive panel;
transmitting, by the intelligent conference interactive panel, conference information to the gateway; and
transmitting, by the gateway, the conference information to the one or more terminal devices.

16. The computer-implemented method of claim 14, wherein the status check signal includes a first prompt signal reminding a present user of a present meeting that a present period of time is about to expire;
wherein the computer-implemented method further comprises:
during the present period of time, displaying, by the intelligent conference interactive panel, a first prompt message to a present user of the present meeting requesting response on whether an extension of the present period of time is needed, the first prompt message being generated based on the first prompt signal; and
receiving a first response signal, by the intelligent conference interactive panel, from the present user in response to the first prompt message.

17. The computer-implemented method of claim 16, wherein, upon a determination that the first response signal requests the extension of the present period of time to an extended period of time overlapping with a subsequent period of time, the computer-implemented method further comprises:
transmitting, by the intelligent conference interactive panel, a second prompt signal to a subsequent user of a subsequent meeting requesting approval on request for the extension of the present period of time to the extended period of time; and
receiving, by the intelligent conference interactive panel, a second response signal from the subsequent user in response to the second prompt signal;
wherein, upon a determination that the second response signal approves the request for the extension of the present period of time to the extended period of time, the computer-implemented method further comprises generating, by the intelligent conference interactive panel, a notification signal notifying the present user the request for the extension of the present period of time to the extended period of time being approved.

18. The computer-implemented method of claim 17, further comprising:
prior to expiration of the extended period of time, generating, by the intelligent conference interactive panel, an update signal; and
transmitting the update signal to the subsequent user indicating that the conference room has become available.

19. The computer-implemented method of claim 14, wherein the status check signal comprises a reminder signal reminding a present user of a present meeting that a present period of time is expired;
wherein the computer-implemented method further comprises transmitting the reminder signal to the present user indicating a request from a subsequent user to use the conference room.

20. A computer-program product comprising a non-transitory tangible computer-readable medium having computer-readable instructions thereon, the computer-readable instructions being executable by a processor to cause the processor to perform:
causing an intelligent conference interactive panel to convert user input into a conference information and to store the conference information;
causing the intelligent conference interactive panel to transmit conference information to one or more terminal devices;

causing the one or more terminal devices to perform a controllable operation based on the conference information transmitted to the one or more terminal devices;

causing the intelligent conference interactive panel to receive a status check signal reminding a user of a conference room that a scheduled conference period of time is expired or about to expire; and causing the intelligent conference interactive panel to generate a status update signal and transmit the status update signal to a signage, causing to display status of the conference room on the signage;

wherein the signage is configured to be installed outside the conference room; and the intelligent conference interactive panel is configured to be installed inside the conference room.

* * * * *